United States Patent

[11] 3,634,806

[72] Inventor Ian L. Fergusson
New Hope, Pa.
[21] Appl. No. 872,906
[22] Filed Oct. 31, 1969
[45] Patented Jan. 11, 1972
[73] Assignee Thomas & Betts Corporation
Princeton, N.J.

[54] MATCHED IMPEDANCE CONNECTOR
6 Claims, 4 Drawing Figs.

[52] U.S. Cl. .......... 339/14 R, 339/17 F, 339/136 M, 339/176 MF
[51] Int. Cl. .......... H01r 3/06, H05k 1/07
[50] Field of Search .......... 339/14 R, 17 F, 17 LC, 17 L, 17 LM, 136 M, 143 R, 143 C, 176 M, 176 MF, 176 MP, 217 S

[56] References Cited

UNITED STATES PATENTS

| | | | |
|---|---|---|---|
| 3,137,537 | 6/1964 | Cole et al. | 339/176 |
| 3,334,325 | 8/1967 | Conrad et al. | 339/14 |
| 3,399,372 | 8/1968 | Uberbacher | 339/17 |
| 3,482,201 | 12/1969 | Schneck | 339/14 |

OTHER REFERENCES

Callaway et al., " High Density P/C Connector," IBM Tech., Vol. 8, No. 3, Aug. 1965, p. 351

*Primary Examiner*—Marvin A. Champion
*Assistant Examiner*—Lawrence J. Staab
*Attorney*—Thomas M. Marshall ABSTRACT: A matched impedance connector which prevents an impedance interruption when multiconductor flat cable is connected to a printed circuit board comprising a connector block having two staggered rows of molded cavities; a plurality of connector pins inserted in said cavities and electrically connected to the alternate signal and ground conductors of a multiconductor flat cable; a metallic plate disposed between the two rows of connector pins and preferably connected to the "ground" pins; and a cover affixed to the block by means of encapsulation.

INVENTOR.
IAN L. FERGUSSON
BY
Thomas M Marshall
ATTORNEY

MATCHED IMPEDANCE CONNECTOR

BACKGROUND OF THE INVENTION

1. Field of the Invention

This invention relates to a connector designed to facilitate connection of multiconductor flat cable to printed circuit boards. In particular, the connector is directed to the problem of connecting multiconductor flat cable to printed circuit boards without an impedance interruption.

2. Prior Art

A variety of connectors for securing multiconductor flat cables to printed circuit boards exist. However, a problem encountered in present connectors when connecting flat cable to printed circuit boards is the impedance interruption. At the moment of connection the impedance may increase to intolerable limits, thereby resulting in a power loss. As an example, the connection of a 50 mil pitch multiconductor cable to a 0.032 printed circuit board using a presently available connector gives rise to a significant impedance increase, thereby resulting in substantial power loss.

Another problem found in many prior art connectors is that after a period of use the connector pins have a tendency to become broken or bent so that contact with the printed circuit board is lost or impaired.

Therefore, it is an object of the present invention to provide a device to connect the individual conductors of a multiconductor flat cable to the appropriate conductors on a printed circuit board.

It is a further object of the present invention to provide a connector assembly which is easy and economical to manufacture and assemble.

The invention contemplates as an additional object a connecting device capable of connecting a multiconductor flat cable to a printed circuit board without an impedance interruption.

Still another object of the invention is to provide a connecting device which will have two pins per conductor line to improve reliability and contact resistance.

SUMMARY OF THE INVENTION

The invention is a connector for securing the individual conductors of a multiconductor flat cable to a printed circuit board without an impedance interruption. The connector comprises a molded block of unitary construction containing a plurality of molded cavities. Into the cavities are inserted connector pins and the pins are then electrically connected to the individual conductors of a multiconductor flat cable. The conductors may be arranged such that all of the signal conductors are disposed above the ground conductors, or vice versa, or as a third alternative, the signal conductors may be alternated with the ground conductors both above and below the plane of the flat conductor cable. Disposed in a cavity between the two rows of connector pins is a stepped metallic plate. The tabs of said plate are folded down and electrically connected to the connector pins and ground conductors connected thereto, providing a ground for the metallic plate. Functionally, the metallic plate generates a field which prevents the interruption of impedance when a connection is made.

DESCRIPTION OF THE DRAWINGS

A better appreciation can be had from the following detailed specification taken in conjunction with the attached drawings in which.

DESCRIPTION OF THE PREFERRED EMBODIMENT

Figures 1, 2, 3, 4:
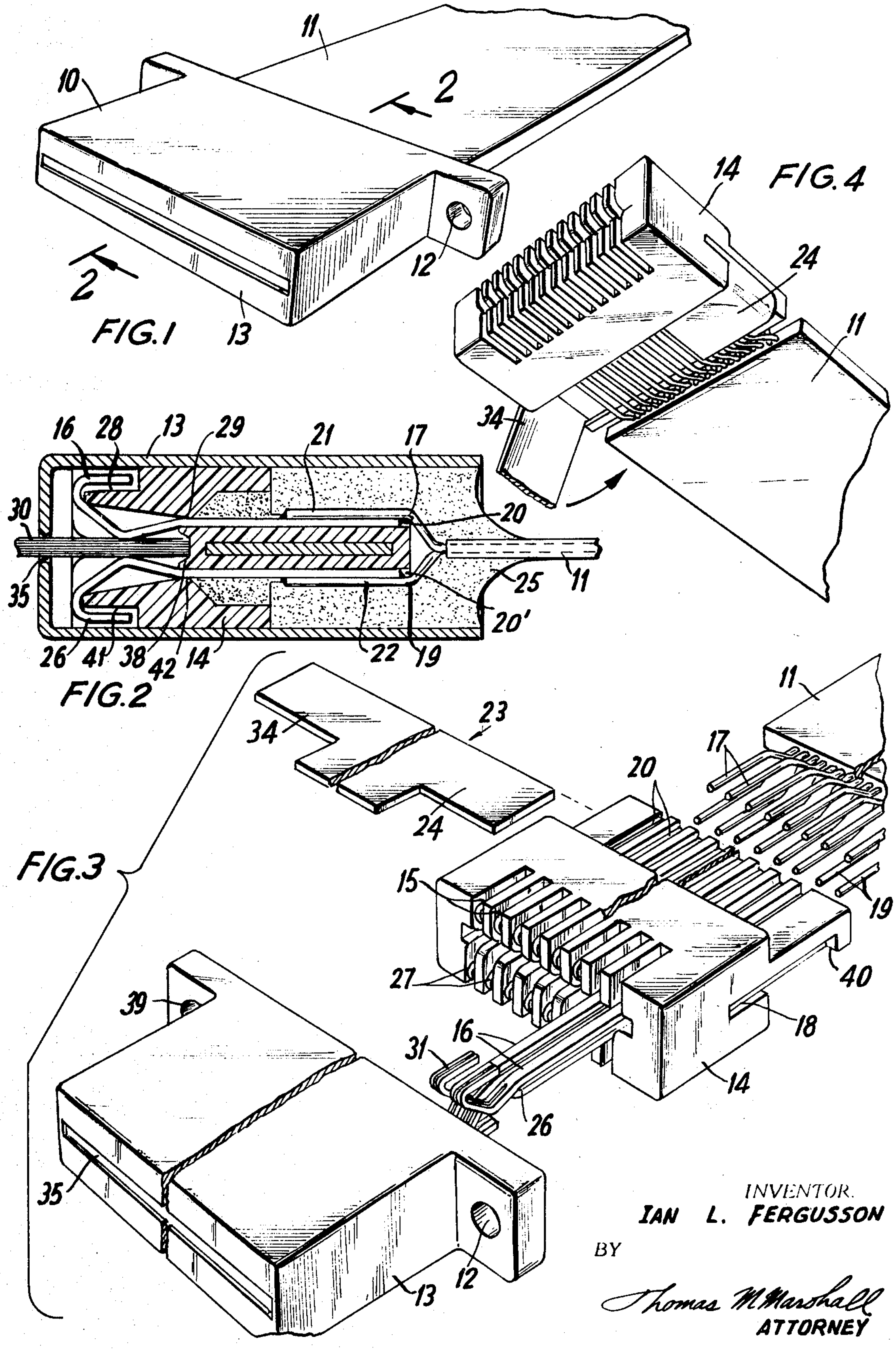
FIG. 1 is a perspective of the connector in its assembled form with the flat conductor cable secured therein.
FIG. 2 is a sectional view along the plane 2–2 of FIG. 1.
FIG. 3 is an exploded perspective view of the connector assembly with a multiconductor flat cable.
FIG. 4 is a perspective view of a preferred embodiment of the connector with a multiconductor flat cable and without the connector cover.

Referring now to the FIGS., FIG. 1 shows a preferred embodiment of the connector assembly of the present invention. As shown, the connector assembly is demoted generally by the numeral 10 and is attached to a multiconductor flat cable 11. Holes 12 and 39 (FIG. 3) are provided at both ends of the connector cover 13 and can be used to attach the connector by means of a bolt, screw or any other fastening device to any suitable structure.

Referring to FIGS. 2, 3, 4, there is shown in more detail the embodiment of the invention shown in FIG. 1. As shown in FIG. 3, the connector comprises a molded connector block 14 of unitary construction which has a plurality of molded cavities 15 and 27 which are staggered in upper and lower rows, respectively. Cavities 15 and 27 are designed to provide sufficient space to accommodate connector pins 16 and 26 respectively, which in turn are suitably connected to alternate conductors 17 and 19 of multiconductor flat cable 11. The cavities 15 and 27 extend from the front of the block 14 to the rear, with the rearward parts of cavities 15 and 27 consisting of shallow channels 20, 20'. A single cavity 18 extends the length of block 14 and is disposed between and spaced from the upper and lower rows of cavities 15 and 27. As shown in FIG. 2, cavities 15 and 27 are designed to make contact with the connector pins 26 as at 41, 42 and with connector pins 16 at 28, 29, thereby holding the pins 16 and 26 in place until they are soldered or otherwise connected to the cable conductors 17 and 19. As shown in FIG. 3, each connector pin 16, 26 is split at its tip 31 so as to provide, in effect, two pins per contact. A flat cable 11 comprising ground conductors 19 alternating with signal conductors 17 is stripped of its insulation and the individual conductors 17 and 19 are inserted into channels 20, 20' and are soldered to the terminal portion of connector pins 16 and 26 as at 21 and 22. As shown in FIGS. 3 and 4, all the ground conductors 19, for example, may be soldered to the bottom row of connector pins 26, and all the signal conductors 17 may be soldered to the top row of connector pins 16. A copper insert 23 which is stepped in the fashion shown in FIG. 3 is inserted into cavity 18. As illustrated in FIG. 4, the tabs 24 and 34 of the insert 23 are folded down and are soldered to the ground conductors 19 and connector pins 26. The edge of the connector block is recessed as at 40 so that the insert 23 will not protrude beyond the edge of the block 14. The cover 13 is then placed over the block 14 and a suitable encapsulation material is poured into the rear position of the cover 13 to cement the cover 13 to the block 14 and to provide strain relief for the cable 11.

Once assembled the connector can be connected to a printed circuit board 30. There is a slot 35 in the cover 13 as well as a groove 38 in the block 14 to give the board 30 support in an up and down direction. The two side sections (not shown) are also dimensioned in a similar manner.

Although a specific embodiment of the connector assembly has been described hereinabove and shown in the drawings, it will be understood that other variations on the specific embodiment are intended to be within the scope of the present invention. Thus the number of conductors to be terminated to connector 10 will vary with the exigencies of the particular application in which the connector assembly is to be used. And, in place of the stepped insert 23 shown in FIG. 3, a rectangular insert can be molded within the connector block 14. The insert would extend only to the edge of tee block 14, thus providing a "floating" ground. Also phosphorus, bronze or any other suitable metal may be used for the insert.

Thus it will be seen that the connector assembly of the present invention overcomes the undesirable features of the prior art connector. The copper insert generates a field which prevents the impedance interruption normally occuring when a a flat cable is connected to a printed circuit board. Accordingly, the subject matched impedance connector may be utilized to connect a 50 mil pitch flat conductor cable to a 0.032 printed circuit board, without an impedance interruption.

Although specific embodiments have been described hereinabove and illustrated in the drawings, it will be understood that other embodiments well known to those skilled in the art are considered to be within the scope of the present invention. Therefore, this invention is not to be limited by such preferred embodiment, but rather by the following claims.

What is claimed is:

1. A matched impedance connector assembly comprising:

a connector block having two staggered rows of cavities adapted to receive connector pins;

a plurality of connector pins inserted in said cavities and electrically connected to individual conductors of multiconductor flat cable;

a metallic insert disposed between the two rows of connector pins; and a connector cover affixed to the connector block by means of encapsulation.

2. A connector as described in claim 1 wherein the connector pins are split at the tip.

3. A connector as described in claim 1 wherein all the signal conductors of the multiconductor flat cable are electrically connected to the one row of connector pins and all the ground conductors are electrically connected to the other row of connector pins.

4. A connector as described in claim 1 wherein the metallic insert is a stepped plate.

5. A connector as described in claim 1 wherein the insert is a stepped plate inserted into a cavity located in the center of the connector block and disposed between the two rows of connector pins.

6. A connector as described in claim 1 wherein the insert is a stepped plate, the tabs of said plate being folded down and electrically connected to the ground conductors and connector pins.

* * * * *